United States Patent [19]

Fort et al.

[11] Patent Number: 5,361,613
[45] Date of Patent: Nov. 8, 1994

[54] VEHICLE ANTI-THEFT DEVICE

[76] Inventors: Raymond S. Fort, 1195 E. 46th St., Brooklyn, N.Y. 11234; Joseph L. Paul, 193 Rhododendron Dr., Westbury, N.Y. 11590

[21] Appl. No.: 42,095

[22] Filed: Apr. 1, 1993

[51] Int. Cl.⁵ ............... B60R 25/06; E05B 65/12
[52] U.S. Cl. ......................... 70/247; 70/202; 70/238
[58] Field of Search ............... 70/207, 192, 209–212, 70/201–204, 225, 226, 237, 238, 245–247, 416, 417

[56] References Cited

U.S. PATENT DOCUMENTS

| | | | |
|---|---|---|---|
| 1,519,086 | 12/1924 | Coffman | 70/238 X |
| 3,710,606 | 1/1973 | Prince | 70/247 X |
| 4,030,323 | 6/1977 | Stanislawczyk | 70/202 X |
| 4,282,769 | 8/1981 | Sandrock | 70/201 X |
| 4,693,099 | 9/1987 | Cykman | 70/203 X |
| 4,825,671 | 5/1989 | Wu | 70/238 |
| 4,831,850 | 5/1989 | Wong et al. | 70/247 X |
| 4,995,250 | 2/1991 | Chiou | 70/238 |
| 5,020,390 | 6/1991 | Chang | 70/246 X |
| 5,038,667 | 8/1991 | Slater | 70/247 X |
| 5,125,249 | 6/1992 | Fields et al. | 70/247 X |
| 5,199,284 | 4/1993 | Lin | 70/238 X |
| 5,239,849 | 8/1993 | Gallardo | 70/226 X |
| 5,267,458 | 12/1993 | Heh | 70/225 X |

FOREIGN PATENT DOCUMENTS

| | | | |
|---|---|---|---|
| 1388314 | 12/1964 | France | 70/247 |
| 2024128 | 1/1980 | United Kingdom | 70/238 |
| 2214885 | 9/1989 | United Kingdom | 70/247 |
| 2238519 | 6/1991 | United Kingdom | 70/238 |
| 850440 | 8/1981 | U.S.S.R. | 70/238 |

Primary Examiner—Peter M. Cuomo
Assistant Examiner—Suzanne L. Dino
Attorney, Agent, or Firm—Goodman & Teitelbaum

[57] ABSTRACT

A vehicle anti-theft device including a gear shifter locking device for enclosing the handle of a vehicle gear shifter therein to prevent the usual shifting of the gear shifter, and a steering wheel locking device to prevent or limit the usual turning of the vehicle steering wheel. The gear shifter locking device includes two mating housing parts for enclosing the gear shifter handle therein, and a bar connecting the housing parts together, one bar end portion being slideably secured to one housing part, and the other housing part being rotatably secured to the opposite bar end portion. A locking mechanism coacts with the bar to lock the housing parts together. A coil spring is tensioned against the bar so that the two housing parts automatically separate apart from each other when unlocked by a key-operated lock mounted on one housing part. The housing parts can be provided with downwardly extending skirt portions to enclose the handle-carrying rod portion of the gear shifter. The steering wheel locking device includes two bars which are locked together by a locking pin of a key-operated lock which is engageable in one of a series of grooves provided in one bar. One bar has a hook portion for hooking onto the steering wheel, and the other bar is connected to one housing part of the gear shifter locking device. Both locking devices are installed in a locked position without employment of the lock key, where the lock key is used to unlock the locking devices.

20 Claims, 3 Drawing Sheets

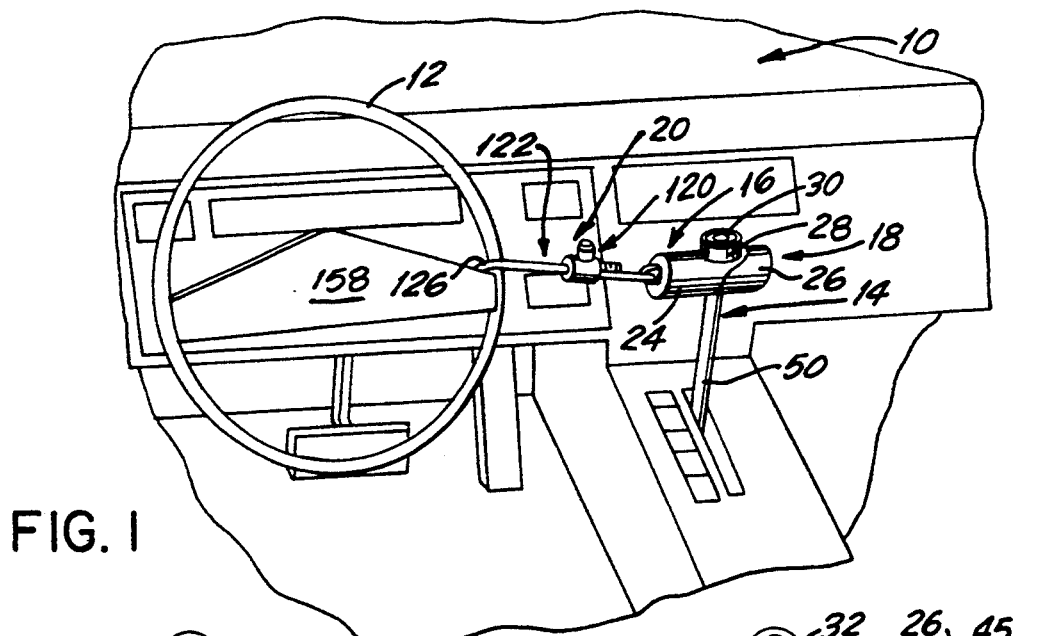
FIG. 1
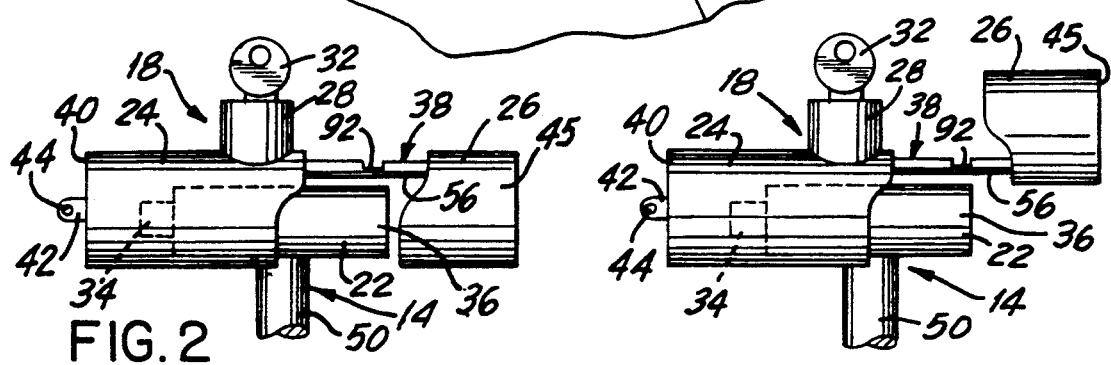
FIG. 2
FIG. 3
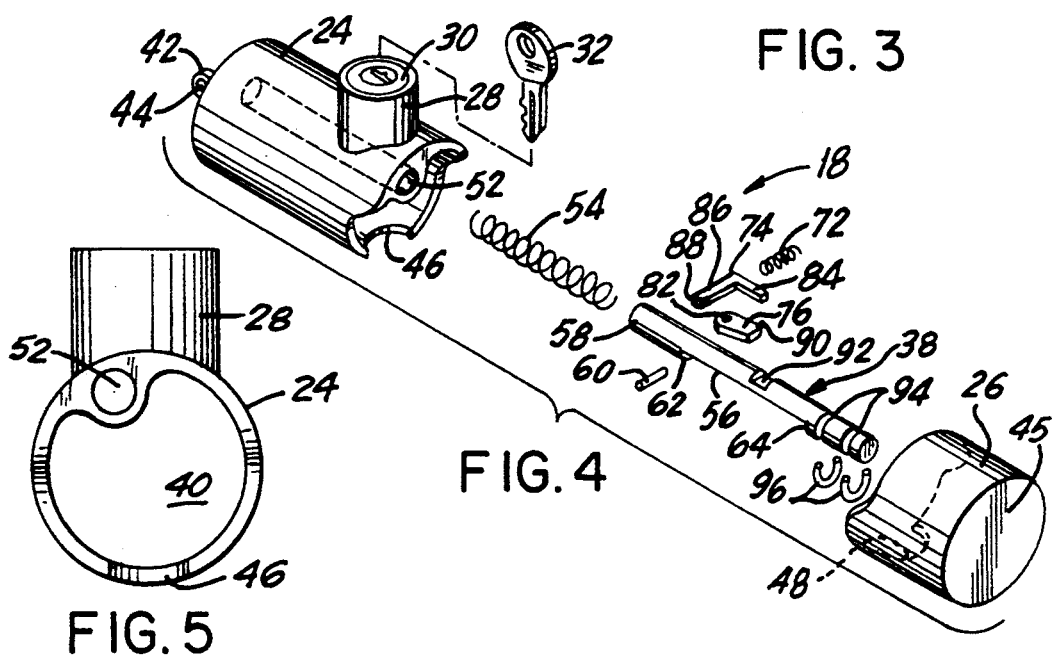
FIG. 4
FIG. 5

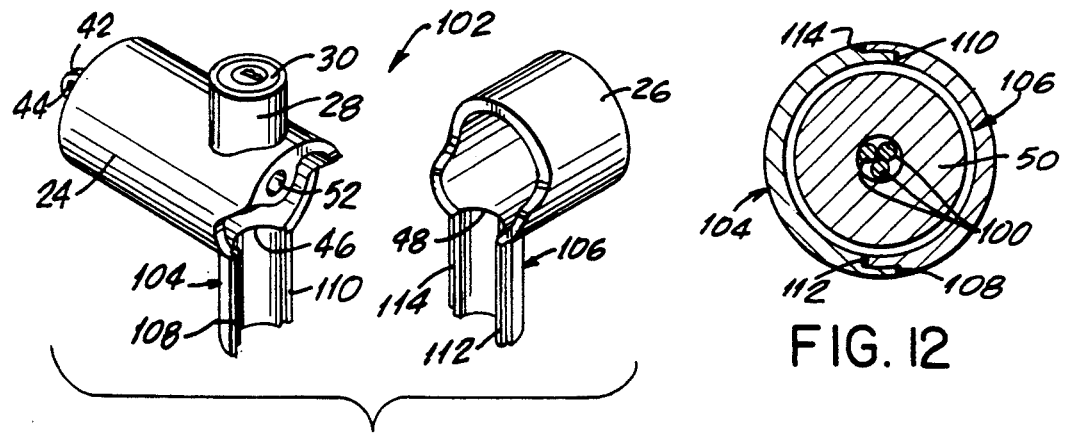
FIG. 11
FIG. 12
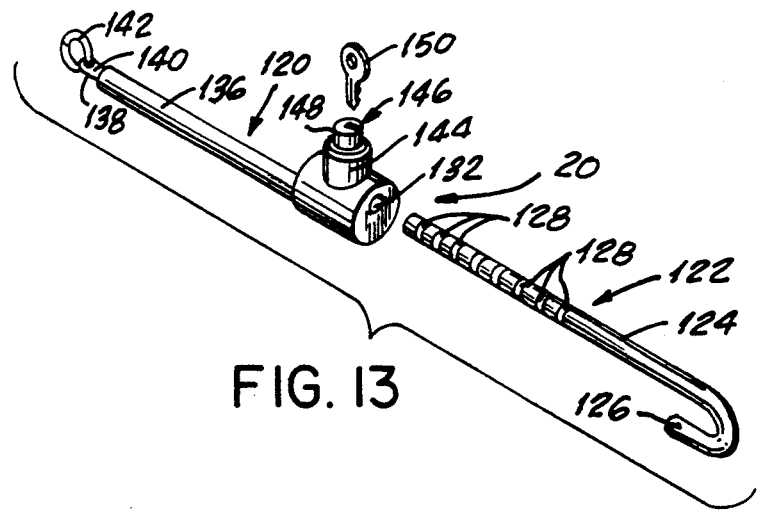
FIG. 13
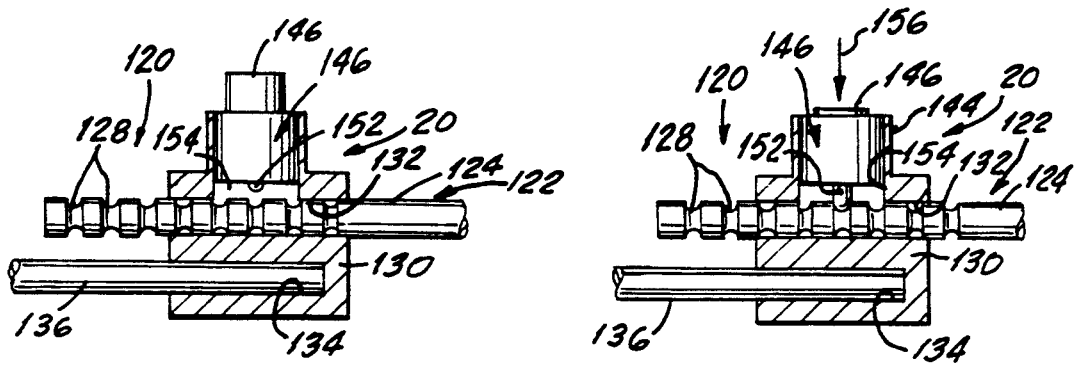
FIG. 14
FIG. 15

VEHICLE ANTI-THEFT DEVICE

BACKGROUND OF THE INVENTION

The invention relates to a locking device, and more particularly, to a vehicle anti-theft device including a gear shifter locking device for enclosing the handle of the vehicle gear shifter therein to prevent the usual shifting of the gear shifter, and a steering wheel locking device to prevent or limit the usual turning of the vehicle steering wheel, so that an unauthorized person is prevented from operating the vehicle.

Vehicle anti-theft devices including a gear shifter locking device are well known in the prior art. These prior art gear shifter locking devices enclose the handle of the gear shifted therein so that the release button on the handle cannot be activated to shift the gear shifter for the operation of the vehicle. However, many of the prior art gear shifter locking devices are not reliable, are too expensive, and/or are constructed in such a manner that they are difficult to mount in a proper manner by the user thereof.

U.S. Pat. No. 3,710,606 discloses a gear shifter locking device including a one piece cylindrical member which fits over the handle of the gear shifter, and is locked thereon by a conventional padlock. U.S. Pat. No. 4,791,795 discloses a gear shifter locking device including a housing which fits over the handle of the gear shifter, the housing being provided with a push-button key-operated lock having a pin thereon which engages a bolt to lock the housing on the handle. U.S. Pat. No. 5,020,390 discloses a gear shifter locking device having a two part housing which encloses the handle of the gear shifter therein, one housing part being provided with a push-button key-operated lock thereon having a pin which engages in one of a series of holes provided in a block secured on the other housing part to lock the two housing parts together on the handle.

Furthermore, steering wheel locking devices are also well known in the prior art. One such steering wheel locking device, which is most popular and has been advertised on television, includes two bars which are locked together, each bar including a hook portion for hooking on opposite sides of the steering wheel, one of the bars being made substantially longer so that when the steering wheel locking device is locked onto the steering wheel, the longer bar extends a substantial distance beyond the steering wheel to limit the turning ability of the steering wheel to thus prevent proper operation of the vehicle by an unauthorized person.

Accordingly, there is presently a need for a reliable, reasonably priced gear shifter locking device that can be easily and quickly mounted on the handle of a vehicle gear shifter to prevent the operation thereof by an unauthorized person. Furthermore, there is also a need for a steering wheel locking device which can be easily and quickly attached to the steering wheel, and which cooperates with the gear shifter locking device to prevent an unauthorized person from operating the vehicle.

SUMMARY OF THE INVENTION

It is accordingly an object of the present invention to provide a vehicle anti-theft device, particularly including a gear shifter locking device, which avoids the problems of the prior art devices.

Another object of the present invention is to provide a vehicle anti-theft device including a gear shifter locking device for enclosing the handle of the vehicle gear shifter therein to prevent the usual shifting of the gear shifter, and a steering wheel locking device to prevent or limit the usual turning of the vehicle steering wheel.

A further object of the present invention is to provide a gear shifter locking device including two mating housing parts for enclosing the gear shifter handle therein, and a bar connecting the housing parts together in a movable arrangement to provide unitary construction.

Still another object of the present invention is to provide a gear shifter locking device, which permits one housing part to be rotated upwardly relative to the other housing part to position and remove from the gear shifter handle.

Another object of the present invention is to provide a gear shifter locking device, which includes a locking mechanism coacting with the bar to lock the housing parts together.

Still another object of the present invention is to provide a gear shifter locking device, in which the two housing parts automatically separate apart into an opened position, preferably by spring means, when unlocked by a key-operated lock mounted on one of the housing parts.

Yet another object of the present invention is to provide a gear shifter locking device, in which each of the housing parts is provided with a downwardly extending skirt portion to enclose the handle-carrying rod portion of the gear shifter.

Another object of the present invention is to provide a vehicle anti-theft device, in which the gear shifter locking device is connected to the steering wheel locking device.

Still another object of the present invention is to provide a vehicle anti-theft device, where the steering wheel locking device includes two bars which are capable of being locked together by a key-operated lock.

Another object of the present invention is to provide a vehicle anti-theft device, where one bar of the steering wheel locking device has a hook portion for hooking onto the steering wheel, and the free end of the other bar is connected to one of the housing parts of the gear shifter locking device.

A further object of the present invention is to provide a vehicle anti-theft device, that can be economically manufactured to be reasonably priced, that is reliable, and that can be easily and quickly mounted on the gear shifter handle when installing the gear shifter locking device, and on the steering wheel when installing the steering wheel locking device.

Briefly, in accordance with the present invention, there is provided a vehicle anti-theft device including a gear shifter locking device for enclosing the handle of a vehicle gear shifter therein to prevent the usual shifting of the gear shifter, and a steering wheel locking device to prevent or limit the usual turning of the vehicle steering wheel. The gear shifter locking device includes two mating housing parts for enclosing the gear shifter handle therein, and a bar connecting the housing parts together in a movable arrangement to provide a unitary construction. One end portion of the bar is slideably secured to one housing part, and the other housing part is rotatably secured to the opposite end portion of the bar to permit mounting thereof on the gear shifter handle. A locking mechanism coacts with the bar to lock the housing parts together. A coil spring is tensioned against the bar so that the two housing parts automatically separate apart from each other into an opened position when unlocked by a key-operated lock mounted on one of the housing parts. Preferably, the housing parts are provided with downwardly extending skirt portions to enclose the handle-carrying rod portion of the gear shifter.

The steering wheel locking device is connected to the gear shifter locking device, where the gear shifter locking device can be used with or without the steering wheel locking device. The steering wheel locking device includes two bars which are locked together by a locking pin of a key-operated lock which is engageable in one of a series of grooves provided in one of the bars. One of the bars has a hook portion for hooking onto the steering wheel, and the free end of the other bar is connected to one of the housing parts of the gear shifter locking device. Both the gear shifter locking device and the steering wheel locking device when installed are fixedly secured in a locked position without employment of the lock key, where the lock key is used to unlock the key-operated locks of the gear shifter locking device and the steering wheel locking device. Preferably, one lock key can be used for both key-operated locks.

BRIEF DESCRIPTION OF THE DRAWINGS

With the above and additional objects and advantages in view, as will hereinafter appear, this invention comprises the devices, combinations and arrangements of the parts hereinafter described by way of example and illustrated in the accompanying drawings of a preferred embodiment in which:

FIG. 1 is a fragmented perspective view of the interior of an automobile, showing a vehicle anti-theft device in accordance with the present invention;

FIG. 2 is a fragmented side elevational view showing the gear shifter locking device, shown in FIG. 1, in an opened position;

FIG. 3 is a fragmented side elevational view similar to FIG. 2, showing the gear shifter locking device in position for removal from the gear shifter;

FIG. 4 is an exploded perspective view of the gear shifter locking device;

FIG. 5 is an end elevational view of one of the housing parts of the gear shifter locking device, the housing part having the key lock thereon;

FIG. 11 is an exploded perspective view showing modified housing parts of the gear shifter locking device;

FIG. 12 is a cross sectional view showing the mating of the modified housing parts of FIG. 11;

FIG. 13 is an exploded perspective view of the steering wheel locking device shown in FIG. 1;

FIG. 14 is a fragmented side elevational view, partly in section, showing the steering wheel locking device being adjusted for the locking of the steering wheel; and FIG. 15 is a fragmented side elevational view, partly in section, similar to FIG. 14, showing the steering wheel locking device in a locked position.

In the various figures of the drawings, like reference characters designate like parts.

DESCRIPTION OF THE PREFERRED EMBODIMENT

Figure 6:
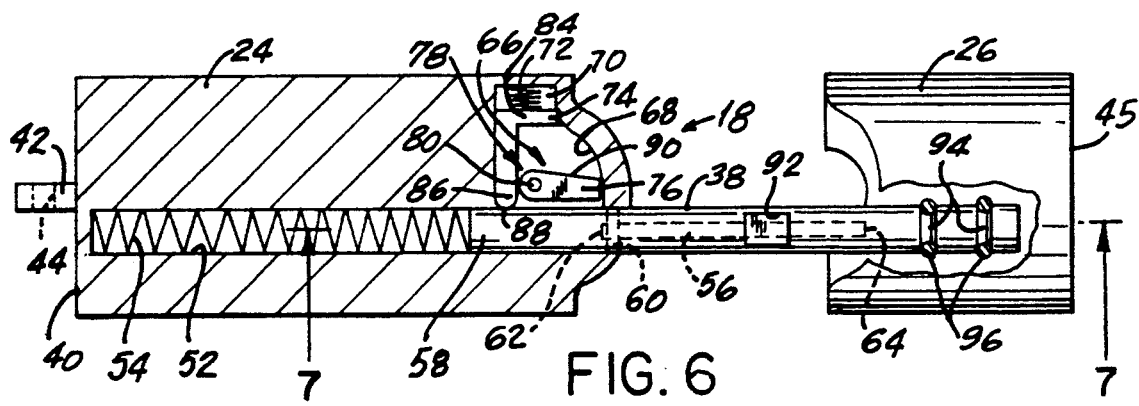
FIG. 6 is a fragmented top view, partly in section, showing the gear shifter locking device in the opened position.

Referring now to the drawings, FIG. 1 shows the interior of an automobile 10 provided with a conventional steering wheel 12 and a gear shifter 14 for either a manual or automatic transmission. A vehicle anti-theft device 16 according to the present invention is provided therein, including a gear shifter locking device 18 for enclosing the handle of the gear shifter 14 therein to prevent the usual shifting of the gear shifter 14, and a steering wheel locking device 20 to prevent or limit the usual turning of the steering wheel 12.

FIG. 2 shows the gear shifter locking device 18 disposed on the horizontal handle 22 of the gear shifter 14 in an opened position. The gear shifter locking device 18 includes two housing parts 24, 26 which are matingly securable together in a locked position as set forth below. The housing part 24 includes a housing portion 28 for housing a conventional key lock 30 fixedly secured therein, which is operated by a key 32 as described below.

It is noted, that the handle 22 is provided with a conventional operating or release button 34 which must be activated in order to shift the gear shifter 14, which is well known in the art. Accordingly, the gear shifter locking device 18 when locked in position on the handle 22, prevents an unauthorized person from pressing-in the operating or release button 34 so that the gear shifter 14 cannot be shifted out of the conventional park position, and therefore the automobile 10 cannot be operated.

The end of the handle 22 opposite the operating or release button 34 includes a rigid stylized portion 36, which can be formed in various lengths depending upon the desired appearance thereof. Accordingly, when the handle end portion 36 is short, there is enough clearance to place the housing part 24 on the handle 22 in the position shown in FIG. 2. However, should the handle end portion 22 be of a longer length, the housing part 26 would interfere with the placement of the housing part 24 on the handle 22, where the clearance is not sufficient. Thus, as shown in FIG. 3, the housing part 26 is rotatable about the connecting bar 38 which securely connects the housing parts 24, 26 together in a unitary construction which permits the housing parts 24, 26 to be moved relative to each other, as will be explained below.

It is noted, that the closed end 40 of the housing part 24 has a projecting portion 42 thereon. The projecting portion 42 has a hole 44 therethrough for connecting the housing part 24 of the gear shifter locking device 18 to the steering wheel locking device 20, as set forth below. The housing part 26 also has a closed end 45.

As shown in FIG. 4, the housing parts 24, 26 are hollow cylindrical members having closed ends 40, 45, respectively. The top portion of the housing part 24 is arcuately curved outwardly at the mouth thereof for receiving the housing portion 28 for the key lock 30 thereon. Accordingly, the top portion of the housing part 26 is arcuately curved inwardly at the mouth thereof to matingly match the corresponding outwardly curved top portion of the housing part 24. Additionally, the bottom portion of both housing parts 24, 26 is provided with an inwardly directed recess 46, 48, respectively, at the mouth thereof to receive the vertically disposed rod portion 50 of the gear shifter 14. Thus, when the gear shifter locking device 18 is locked on the handle 22, the gear shifter rod portion 50 prevents any horizontal movement of the housing parts 24, 26 relative to the handle 22.

Furthermore, the top portion of the housing part 24 has been made thicker than the side portions thereof so that a longitudinally extending blind hole 52 can be provided therein, as shown in FIG. 5. The blind hole 52 receives a coil spring 54 and the connecting bar 38 therein, as best shown in FIG. 6. The connecting bar 38 has a longitudinally extending recess 56 cut therein along the bottom portion thereof.

Accordingly, first the coil spring 54 is inserted into the blind hole 52, and then the end portion 58 of the connecting bar 38 is inserted into the blind hole 52 against the pressure of the coil spring 54 until a portion of the recess 56 is disposed within the blind hole 52. Then, a pin 60 is fixedly secured across the bottom portion of the mouth of the blind hole 52, such as by welding, being secured by a force fit in holes provided in the walls of the blind hole 52 and the like, so that a portion of the pin 60 is disposed in the recess 56 of the connecting bar 38. Thus, the pin 60 secures the connecting bar 38 to the housing part 24, while permitting the end portion 58 of the connecting bar 38 to move longitudinally within the blind hole 52, the movement being limited to the longitudinal length of the recess 56 of the connecting bar 38, as shown in FIGS. 6-9. Accordingly, the opposite end walls 62, 64 of the recess 56 function as stops when contacting the pin 60, as set forth below.

A recess 66, as best shown in FIG. 6, is provided in the top portion of the housing part 24 in communication with the opening through the housing portion 28 on the housing part 24, and also in communication with the blind hole 52, where the recess 66 can be formed before the housing portion 28 is secured to the housing part 24. The recess 66 includes an enlarged portion 68 adjacent the blind hole 52, which has a curved wall adjacent the mouth of the housing part 24, and a smaller portion 70 adjacent the side wall of the housing part 24. The recess 66 receives the coil spring 72, the L-shaped bar 74 and the lever 76 therein, which provide the locking mechanism 78, as set forth below.

In the assembling of the locking mechanism 78, the lever 76 is secured to the end of the conventional, rotatable shaft (not shown) of the conventional key lock 30, such as by a rivet 80, shown in FIG. 6, extending through the hole 82 in one end of the lever 76 to fixedly secure the lever 76 to the key lock shaft for rotation therewith. The conventional key lock 30 is then fixedly secured within the housing portion 28 before the housing portion 28 is secured to the housing part 24, so that the lever 76 is disposed below the conventional key lock 30 in a spaced apart position outside the housing portion 28. The coil spring 72 is positioned in the smaller portion 70 of the recess 66 with the leg 84 of the L-shaped bar 74 disposed against the coil spring 72 in a tensioned condition. The other leg 86 of the L-shaped bar 74 is disposed against the inner wall of the enlarged portion 68 of the recess 66 so that the free end 88 of the leg 86 of the L-shaped bar 74 abuts against the side of the connecting bar 38, as best shown in FIG. 6.

The housing portion 28 is now secured to the housing part 24 so that the lever 76 is disposed within the enlarged portion 68 of the recess 66. In this position, the rotatable rivet 80 is disposed adjacent to the leg 86 of the L-shaped bar 74, and one longitudinal edge of the lever 76 is disposed adjacent and parallel to the connecting bar 38. The opposite longitudinal edge of the lever 76 is tapered to form a cam portion 90. The cam portion 90 faces towards the leg 84 of the L-shaped bar 74, the function of which will be set forth below. Another recess 92 is cut in the upper surface of the connecting bar 38 for coacting with the L-shaped bar 74, as set forth below.

Figure 7:
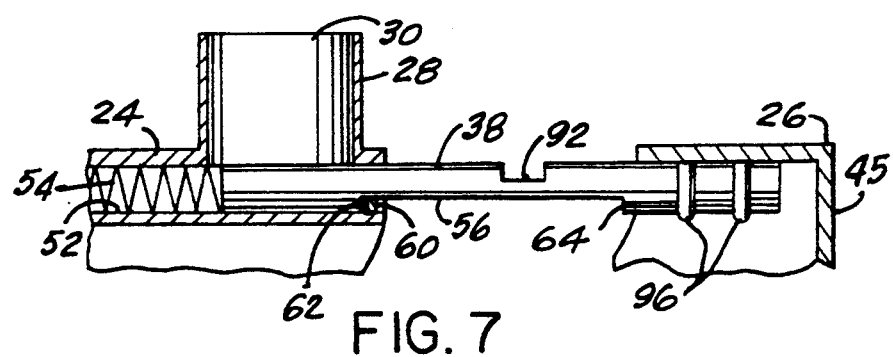
FIG. 7 is a fragmented cross sectional view taken along line 7—7 of FIG. 6.

As shown in FIG. 4, the opposite end of the connecting bar 38 has two spaced apart circular grooves 94 therein for receiving associated U-shaped bar members 96. Accordingly, as shown in FIG. 6 and 7, after the U-shaped bar members 96 are received in their associated grooves 94 in the connecting bar 38, the free ends of each of the U-shaped bar members 96 are secured by conventional means, such as by welding, soldering and the like, to the inner wall of the top portion of the housing part 26 to rotatably secure the connecting bar 38 to the housing part 26. Thus, though the housing part 26 is secured to the connecting bar 38, the housing part 26 can be rotated around the connecting bar 38 in the manner mentioned above with respect to FIG. 3. Obviously, the housing part 26 can be connected to the connecting bar 38 before or after the connecting bar 38 is connected to the housing part 24.

The installation and the locking arrangement of the gear shifter locking device 18 will now be discussed. With the housing part 26 in a rotated upward position, the housing part 24 is mounted on the end of the handle 22 of the gear shifter 14 having the release button 34 thereon to enclose the release button 34 therein, as shown in FIG. 3. The housing part 26 is then rotated to the downward position, as shown in FIG. 2, without the key 32 being inserted in the key lock 30. In this position, the locking mechanism 78 is in the position shown in FIG. 6, where the coil spring 54 acts against the connecting bar 38 to maintain the connecting bar 38 an outwardly extending position with the end wall stop 62 of the recess 56 abutting against the pin 60, as best shown in FIG. 7. Accordingly, the free end 88 of the leg 86 of the L-shaped bar 74 is biased against the side of the connecting bar 38 by the force of the coil spring 72. Furthermore, the lever 76 in its locked position parallel to the connecting bar 38, being spaced from the leg 84 of the L-shaped bar 74.

With the housing part 24 being held in one hand, the user grasps the housing part 26 with the other hand, and pushes the housing part 26 into mating engagement with the housing part 24 so that the housing part 26 encloses the opposite end portion 36 of the handle 22, therein with the entire handle 22 being enclosed within the housing parts 24, 26 as shown in FIG. 1. Accordingly, the connecting bar 38 is now in an inward position within the blind hole 52, pushing against the tensioned coil spring 54 with the end wall stop 64 of the recess 56 abutting against the pin 60, and the locking mechanism 78 is in the locked position, shown in FIGS. 8 and 9, as set forth below.

Figure 8:
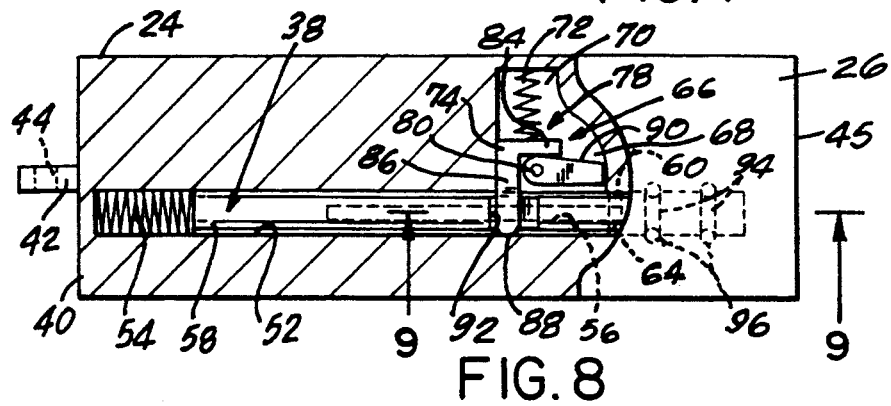
FIG. 8 is a top plan view, partly in section, of the gear shifter locking device in a locked position.
Figure 9:
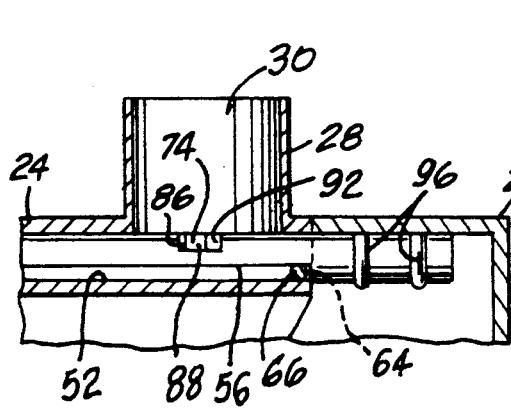
FIG. 9 is a fragmented cross sectional taken along line 9—9 of FIG. 8.

The recess 92 in the upper surface of the connecting bar 38 is selectively positioned thereon so that when the end wall stop 64 engages the pin 60, the recess 92 is in alignment with the leg 86 of the L-shaped bar 74 to receive the leg 86 therein. It is noted, that the depth of the recess 92 is substantially equal to the thickness of the leg 86, and the longitudinal length of the recess 92 is greater than the width of the leg 86 to enable the leg 86 to be received within the recess 92. Accordingly, the spring 72, which is under tension, forces the L-shaped bar 74 towards the connecting bar 38 so that the leg 86 enters into and is positioned transversely across the recess 92. The other leg 84 of the L-shaped bar 74 is moved into engagement against the cam portion 90 of the lever 76 to stop any further movement of the L-shaped bar 74, as shown in FIG. 8.

The above engagement of the leg 86 of the L-shaped bar 74 in the recess 92 of the connecting bar 38 prevents the connecting bar 38 and the housing part 26 secured thereof from being pulled away from or separated from the housing part 24 so that the housing parts 24 and 26 are now locked together. Furthermore, the mating engagement of the housing parts 24 and 26, particularly the mating arcuately curved top mouth portions thereof, prevent the housing part 26 from being rotated relative to the housing part 24. Additionally, the recesses 46, 48 on the bottom portions of the housing parts 24, 26, respectively, engage around the rod portion 50 of the gear shifter 14 so that the housing parts 24 and 26, individually or together, cannot be rotated relative to the handle 22.

It is noted from above, that the housing parts 24, 26 were automatically locked together when the housing parts 24, 26 were matingly engaged with each other, where the key lock 30 was not involved in the above-mentioned locking arrangement. The function of the key lock 30 will be described below.

Figure 10:
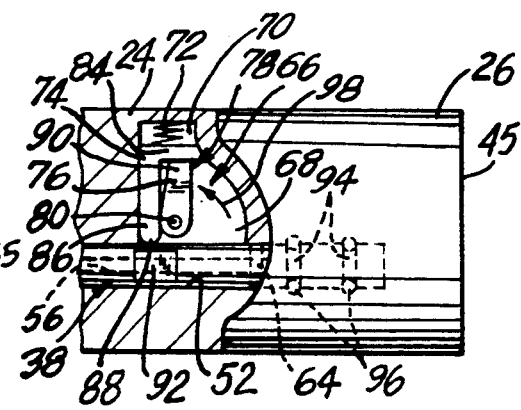
FIG. 10 is a fragmented top plan view, partly in section, of the gear shifter locking device being unlocked.

The key lock 30 is used to remove the gear shifter locking device 18 from the handle 22 of the gear shifter 14. Accordingly, the user inserts the proper key 32 into the key lock 30, and rotates the key 32 the required 90 degrees so that the conventional cylinder plug and shaft of the key lock 30 also rotates the same 90 degrees, where the key lock 30 is of the conventional type so that a description of the tumbler arrangement therein is not thought necessary. Accordingly, the lever 76 which is fixedly secured to the key lock shaft also rotates the same 90 degrees, in the direction of arrow 98, to the position shown in FIG. 10.

When the lever 76 is being rotated, the cam portion 90 thereof engages the leg 84 of the L-shaped bar 74 to camingly move the leg 84 transversely away from the connecting bar 38. Thus, the other leg 86 of the L-shaped bar 74 is moved out of the recess 92 in the upper portion of the connecting bar 38 to the position also shown in FIG. 10. During this procedure, the leg 84 of the L-shaped bar 74 compresses the coil spring 72 to a tensioned arrangement.

Once the leg 86 is out of the recess 92, thus freeing the connecting bar 38, the tensioned coil spring 54 pushes the connecting bar 34 outwardly to the above-mentioned outwardly extending position when the end wall stop 62 of the recess 56 abuts against the pin 60, as shown in FIGS. 6 and 7. Thus, the housing part 26, which is secured to the connecting bar 38 and moves outwardly therewith, is automatically separated from the housing part 24 to position the gear shifter locking device 18 in the opened position shown in FIG. 2. Once the housing parts 24, 26 are in the opened position, the key 32 is rotated 90 degrees back to the locked position, and the key 32 is removed.

During the rotation of the key 32 back to the locked position, the cylinder plug and shaft of the lock 30 and the lever 76 attached thereto are also rotated back to their normal position, the lever 76 now being in the parallel position with respect to the connecting bar 38, as shown in FIG. 6. The housing part 26 is now rotated to its upper position shown in FIG. 3, and the gear shifter locking device 18 is reproved from the handle 22 of the gear shifter 14. The above procedure is now repeated when the user once again desires to lock the gear shifter 14.

In some cases, an unauthorized person in order to circumvent the gear shifter locking device 18, will cut or break off the rod portion 50 of the gear shifter 14, which is usually fabricated from a plastic material, in order to gain access to the electrical wires 100 therein in order to shift the gears without shifting the gear shifter 14. Accordingly, FIG. 11 shows a modified gear shifter locking device 102 to prevent the cutting or breaking-off the rod portion 50 of the gear shifter 14. The gear shifter locking device 102 for the most part is the same as the above-mentioned gear shifter locking device 18, where the housing parts 24 and 26 are the same in each.

However, the gear shifter locking device 102 includes a semi-circular, downwardly extending skirt portion 104 fixedly secured on the bottom portion of the housing part 24 communicating with the recess 46 therein. Likewise, a mating semi-circular, downwardly extending skirt portion 106 is fixedly secured on the bottom portion of the housing part 26 communicating with the recess 48 therein. Preferably, the side edges 108, 110 of the skirt portion 104 are stepped. Likewise, the side edges 112, 114 of the skirt portion 106 are also stepped to matingly engage with the associated side edges 108, 110, respectively, of the skirt portion 104. Thus, the skirt portions 104, 206, when secured together as shown in FIG. 12, enclose the rod portion 50 of the gear shifter 14 therein to prevent the cutting or breaking-off of the rod portion 50. In other respects, the gear shifter locking device 102 functions in the same manner as the gear shifter locking device 18, as mentioned above.

FIGS. 13, 14 and 15 show the steering wheel locking device 20 of the vehicle anti-theft device 16 of the present invention, shown in FIG. 1. The steering wheel locking device 20 includes two bar portions 120 and 122 which are removably connected together. The bar portion 122 includes an elongated bar 124 having a hook portion 126 on one end thereof. The opposite end portion of the bar 124 is provided with a series of longitudinally spaced apart grooves 128 in the outer surface thereof. The grooves are disposed closely adjacent to each other.

The other bar portion 120 includes a cylindrical housing 130 having an upper hole 132 extending longitudinally therethrough, and a second lower longitudinally extending, parallel aligned blind hole 134. An elongated bar 136 has one end thereof fixedly secured within the blind hole 134 by conventional means, such as by a force fit, welding and the like. The bar 136 has a projecting portion 138 on the opposite free end thereof. The projecting portion 138 has a hole 140 therethrough to receive a chain link 142. Accordingly, the chain link 142 is also received in the hole 44 in the projecting portion 42 on the closed end 40 of the above-mentioned housing part 24 to secure the bar portion 120 to the housing part 24, in the manner shown in FIG. 1. Additionally, the housing 130 includes a housing portion 144 for housing a conventional key-operated push-button lock 146. The push-button lock 146 includes a conventional button-like cylinder plug 148 having a conventional key hole therein for receiving the key 150. As best shown in FIGS. 14, 15, a pin 152 is connected to the end of the button-like cylinder plug 148 opposite the key hole.

The key-operated push-button lock 146 is well known in the art, where the operation thereof will now be briefly described. In the open position, the button-like cylinder plug 148 extends outwardly from the key-operated push-button lock 146 as shown in FIG. 13, 14. The user, pushes the button-like cylinder plug 148 into the key-operated push-button lock 146, as shown in FIG. 15, so that the tumblers within the key-operated push-button lock 146 engage the button-like cylinder plug 148 to lock same within the key-operated push-button lock 146. Accordingly, to unlock same, the user inserts the key 150 in the key hole so that the key aligns the tumblers therein to permit a spring within the key-operated push-button lock 146 to push the button-like cylinder plug 148 out of the key-operated push-button lock 146 to the position shown in FIGS. 13, 14. In some types of locks, the key must be turned to rotate the button-like cylinder plug in order to activate the spring. Accordingly, when the button-like cylinder plug 148 is extended out in the unlocked position, the pin 152 extends only slightly outwardly from the key-operated push-button lock 146, as shown in FIG. 14. However, when the button-like cylinder plug 148 is pushed in to the locked position, a substantial length of the pin 152 extends outwardly from the key-operated push-button lock 146, as shown in FIG. 15.

A recess 154, as best shown in FIGS. 14 and 15, is provided in the top portion of the housing 130 in communication with the opening through the housing portion 144 on the housing 130, and also in communication with the upper hole 132, where the recess 154 can be formed before the housing portion 144 is secured to the housing 130. The push-button lock 146 is fixedly secured within the housing portion 144 in a conventional manner, such as by a force fit, welding and the like, where preferably the bottom portion of the push-button lock 146 extends into the recess 154. As shown in FIG. 14, the pin 152 extends only slightly into the recess 154 when the cylinder plug 148 is in the unlocked position. However, when the cylinder plug 148 is in the locked position, as shown in FIG. 15, the pin 152 extends into the upper hole 132.

The installation of the steering wheel locking device 20 will now be explained. In the normal unlocked position, the end portion of the bar 124 having the grooves 128 therein is inserted into the upper hole 132, as shown in FIG. 14, so that the bar 124 can freely move within the upper hole 132 relative to the bar portion 120. Accordingly, after the gear shifter locking device 18 or 102 is securely locked on the gear shifter 14 with the bar portion 120 secured to the housing part 24 thereof, the hook portion 126 of the bar portion 122 is hooked onto the steering wheel 12, as shown in FIG. 1.

The bar 124 is now adjusted within the upper hole 132 so that the bar portion 122 exerts a pulling tension on the steering wheel 12, and the bar portion 120 exerts a pulling tension on the housing part 24 of the gear shifter locking device 18 or 102. Once this tensioned arrangement has been achieved, the user presses the button-like cylinder plug 148 into the push-button lock 146, as indicated by arrow 156 in FIG. 15. Accordingly, the pin 152 now is extended downwardly into the blind hole 134, and engages into one of the grooves 128 in the bar 124, where an adjustment of the bar 124 may be required for this engagement. Thus, the pin 152 secures the bar 124 within the housing 130 so that the bar portions 120 and 122 are secured together in a locked arrangement.

In this locked arrangement, because of the conventional connecting member 158 of the steering wheel 12, the steering wheel 12 cannot be turned in a counter-clockwise direction as shown in FIG. 1, thus limiting the turning of the steering wheel 12. Obviously, rather than the hook portion 126 being hooked above the connecting member 158, the hook portion 126 could be positioned below the connecting member 158 to prevent a clockwise rotation of the steering wheel 12. It is noted, that in some recent automobiles, the connecting member 158 has an opening therein adjacent to the steering wheel 12, so that the hook portion 126 can be hooked into this opening to prevent both clockwise and counter-clockwise rotation of the steering wheel 12.

To free the steering wheel 12, the user inserts the key 150 into the key hole of the lock 146, and turns the key 150 if required as for some types of push-button locks, so that the cylinder plug 148 springs back out of the lock 146 to the unlocked position shown in FIG. 14. In this position, the pin 152 is disengaged from the associated groove 128 in the bar 124 so that the bar portions 120 and 122 are once again free to move relative to each other, thereby permitting the hook portion 126 to be removed from the steering wheel 12.

It is noted, that it is well known in the lock art, to cut the tumblers in two different locks in the same manner so that one key can open both locks. Accordingly, the tumblers in the above-mentioned locks 30 and 146 can be cut in the same manner so that only one key is necessary. Thus, the above-mentioned keys 32 and 150 can be exactly the same so that either key 32, 150 can open both locks 30 and 146 as a convenience for the user.

It is further noted, that both the gear shifter locking device 18 and 102 and the steering wheel locking device 20 are secured in a locking engagement without the use of a key, where both gear shifter locking devices 18 and 102 lock automatically on the gear shifter 14, and the steering wheel locking device 20 also locks automatically on the steering wheel 12, which is also a convenience for the user. The keys 32 and 150, either as a single key or two separate keys, are only used to unlock the gear shifter locking devices 18 and 102 and the steering wheel locking device 20, respectively. Thus, both hands of the user are free for engaging the gear shifter locking devices 18 and 102 on the gear shifter 14, and for engaging the steering wheel locking device 20 on the steering wheel 12.

Obviously, all the parts of the gear shifter locking devices 18 and 102 and of the steering wheel locking device 20 are fabricated from a suitable metal material to protect same from an unauthorized person.

Numerous alterations of the structures herein discussed will suggest themselves to those skilled in the art. However, it is to be understood that the present disclosure relates to preferred embodiments of the invention which are for purposes of illustration only, and are not to be construed as a limitation of the invention.

What is claimed is:

1. A vehicle anti-theft device comprising:
 a gear shifter locking device for enclosing a handle mounted on a rod portion of a vehicle gear shifter to prevent a person from pressing a release button on the handle;

said gear shifter locking device including mating first and second housing parts, said first housing part enclosing one portion of the handle disposed on one side of the rod portion, said second housing part enclosing the remaining portion of the handle disposed on an opposite side of the rod portion;

bar means being connected to both said first and second housing parts for permitting said first and second housing parts to be moved relative to each other between a spaced apart opened first position and a matingly locked together second position enclosing the handle and the release button therein;

said bar means connecting said first and second housing parts together as a unitary construction;

said bar means including an elongated bar;

connecting means for permitting said bar to move longitudinally in said first housing part so that said second housing part can be moved between said first and second positions;

securement means for locking said first and second housing parts together in said second position;

unlocking means for engaging said securement means to unlock said first and second housing parts so that said first and second housing parts can be moved apart to said opened first position, said unlocking means including a lock; and spring means to automatically push said bar to an outwardly extended position from said first housing part when said lock is unlocked so that said second housing part is moved by said bar to said opened first position automatically when said lock is unlocked.

2. A vehicle anti-theft device according to claim 1, wherein each of said first and second housing parts is a hollow cylindrical member having a closed end and an opposite open end, one cylindrical member being arcuately curved inwardly at a mouth portion of said open end to matingly match a corresponding outwardly curved mouth portion at said open end of the other cylindrical member.

3. A vehicle anti-theft device according to claim 2, wherein each mouth portion has an inwardly directed recess to receive the rod portion of the gear shifter therein.

4. A vehicle anti-theft device according to claim 3, wherein each cylindrical member includes a semi-circular, downwardly extending skirt portion fixedly secured to a bottom portion thereof in communication with said recess therein to enclose the rod portion of the gear shifter.

5. A vehicle anti-theft device according to claim 4, wherein side edges of each skirt portion are stepped so that said side edges of said skirt portion of said one cylindrical member matingly engage with said side edges of said skirt portion of said other cylindrical member.

6. A vehicle anti-theft device according to claim 1, wherein an end portion of said bar is movably disposed in a blind hole provided in said first housing part, and an opposite end portion of said bar is connected to said second housing part.

7. A vehicle anti-theft device according to claim 6, wherein said spring means includes a coil spring disposed in said blind hole between an end wall of said blind hole and said bar.

8. A vehicle anti-theft device according to claim 1, wherein said connecting means includes a longitudinally extending recess in said bar coacting with a pin disposed in said recess, said pin being secured to said first housing part so that said bar is movable relative to said pin.

9. A vehicle anti-theft device according to claim 1, including a steering wheel locking device having a hook portion for hooking on a vehicle steering wheel to limit turning of the steering wheel, said steering wheel locking device being connected to said first housing part of said gear shifter locking device, and locking means for locking said steering wheel locking device in an extended position between the steering wheel and said first housing part.

10. A vehicle anti-theft device according to claim 9, wherein said steering wheel locking device includes a housing, an elongated first bar fixedly secured to said housing, and an elongated second bar extending through a hole in said housing in a movable arrangement, said second bar being parallel to said first bar and being movable relative to said first bar, said hook portion being provided on one of said first and second bars with the other one of said first and second bars being secured to said first housing part.

11. A vehicle anti-theft device according to claim 10, wherein said second bar has groove means for coacting with said locking means to lock said second bar in a fixed position relative to said first bar when said steering wheel locking device is in said extended position.

12. A vehicle anti-theft device according to claim 11, wherein said groove means includes a series of longitudinally spaced apart grooves in an outer surface of said second bar, and said locking means includes a lock disposed on said housing in communication with said hole in said housing, said lock being provided with a locking pin movable between a first position spaced from said hole when said lock is unlocked and a second position in said hole when said lock is locked, said locking pin being engaged in one of said grooves when in said second position with said lock being locked in order to lock said second bar in said fixed position.

13. A vehicle anti-theft device comprising:

a gear shifter locking device for enclosing a handle mounted on a rod portion of a vehicle gear shifter to prevent a person from pressing a release button on the handle;

said gear shifter locking device including mating first and second housing parts, said first housing part enclosing one portion of the handle disposed on one side of the rod portion, said second housing part enclosing the remaining portion of the handle disposed on an opposite side of the rod portion;

bar means being connected to both said first and second housing parts for permitting said first and second housing parts to be moved relative to each other between a spaced apart opened first position and a matingly locked together second position enclosing the handle and the release button therein;

said bar means connecting said first and second housing parts together as a unitary construction;

said bar means including an elongated bar;

connecting means for permitting said bar to move longitudinally in said first housing part so that said second housing part can be moved between said first and second positions;

securement means for locking said first and second housing parts together in said second position;

said securement means including a movable member disposed in said first housing part, and a recess provided in said bar;

said movable member being spaced from said recess when said bar is in an outwardly extended position from said first housing part with said second housing part being in said opened first position;

said movable member being disposed in said recess when said bar is in an inward position in said first housing part with said second housing part being matingly engaged with said first housing part in said second position to lock said first and second housing parts together;

said movable member being L-shaped to provide first and second legs, said first leg being disposed in said recess when said bar is in said inward position; and unlocking means for engaging said securement means to unlock said first and second housing parts so that said first and second housing parts can be moved apart to said opened first position, said unlocking means including a lock.

14. A vehicle anti-theft device according to claim 13, wherein spring means are provided in said first housing part for acting on said second leg to push said first leg into said recess when said bar is in said inward position.

15. A vehicle anti-theft device according to claim 13, wherein said lock is provided with a lever having a cam portion, said cam portion acting on said second leg to withdraw said first leg from said recess to unlock said first and second housing parts.

16. A vehicle anti-theft device comprising:

a gear shifter locking device for enclosing a handle mounted on a rod portion of a vehicle gear shifter to prevent a person from pressing a release button on the handle;

said gear shifter locking device including mating first and second housing parts, said first housing part enclosing one portion of the handle disposed on one side of the rod portion, said second housing part enclosing the remaining portion of the handle disposed on an opposite side of the rod portion;

bar means being connected to both said first and second housing parts for permitting said first and second housing parts to be moved relative to each other between a spaced apart opened first position and a matingly locked together second position enclosing the handle and the release button therein;

said bar means connecting said first and second housing parts together as a unitary construction;

means for rotatably securing said second housing part to said bar means so that said second housing part can be rotated about said bar means relative to said first housing part in order to be in an upward position when in said opened first position;

securement means for locking said first and second housing parts together in said second position; and unlocking means for engaging said securement means to unlock said first and second housing parts so that said first and second housing parts can be moved apart to said opened first position, said unlocking means including a lock.

17. A vehicle anti-theft device according to claim 16, wherein each of said first and second housing parts is a hollow cylindrical member having a closed end and an opposite open end, one cylindrical member being arcuately curved inwardly at a mouth portion of said open end to matingly match a corresponding outwardly curved mouth portion at said open end of the other cylindrical member.

18. A vehicle anti-theft device according to claim 17, wherein each mouth portion has an inwardly directed recess to receive the rod portion of the gear shifter therein.

19. A vehicle anti-theft device according to claim 18, wherein each cylindrical member includes a semi-circular, downwardly extending skirt portion fixedly secured to a bottom portion thereof in communication with said recess therein to enclose the rod portion of the gear shifter.

20. A vehicle anti-theft device according to claim 16, including a steering wheel locking device having a hook portion for hooking on a vehicle steering wheel to limit turning of the steering wheel, said steering wheel locking device being connected to said first housing part of said gear shifter locking device, and locking means for locking said steering wheel locking device in an extended position between the steering wheel and said first housing part.

* * * * *